April 13, 1926.

C. FIELD 1,580,658

DRYING APPARATUS

Filed Jan. 5, 1921

Inventor
Crosby Field,
By his Attorney C. P. Goepel.

April 13, 1926. 1,580,658
C. FIELD
DRYING APPARATUS
Filed Jan. 5, 1921 7 Sheets-Sheet 2

Inventor
Crosby Field,
By his Attorney C. P. Goepel.

April 13, 1926.  
C. FIELD  
DRYING APPARATUS  
Filed Jan. 5, 1921  
1,580,658  
7 Sheets-Sheet 3

Inventor  
Crosby Field,  
By his Attorney  
C. P. Goepel

April 13, 1926. 1,580,658

C. FIELD

DRYING APPARATUS

Filed Jan. 5, 1921 7 Sheets-Sheet 5

Inventor
Crosby Field,
By his Attorney C. P. Goepel

April 13, 1926.

C. FIELD 1,580,658

DRYING APPARATUS

Filed Jan. 5, 1921　　7 Sheets-Sheet 6

Inventor
Crosby Field,
By his Attorney C. P. Goepel.

Patented Apr. 13, 1926

1,580,658

UNITED STATES PATENT OFFICE.

CROSBY FIELD, OF NEW YORK, N. Y.

DRYING APPARATUS.

Application filed January 5, 1921. Serial No. 435,272.

*To all whom it may concern:*

Be it known that I, CROSBY FIELD, a citizen of the United States, and a resident of the borough of Manhattan, in the city, county, and State of New York, have invented certain new and useful Improvements in Drying Apparatus, of which the following is a specification.

This invention relates to an improved drying apparatus and has for its primary object to provide such an apparatus which will be reliable and efficient in the drying of chemicals or other materials having a relatively wide range of moisture content and in the drying of which varying conditions, sometimes quite difficult of being successfully met may be properly compensated for.

In the drying of chemicals and other materials, a single factory frequently encounters a great number of operating problems which must be solved in a practical way, and special apparatus and procedure must be employed in the drying of the different classes of materials. Thus for example, to enumerate a few of the practical requirements, different materials must be dried under various vapor pressures either above or below atmospheric, in air or in gas or in gases of a special nature, in contact with certain special materials which will not effect the quality of the material being dried, under various degrees of temperature and with particular regard to not exceeding a certain maximum temperature above which the quality of the material would be seriously impaired, under various time relations to avoid the exposure of the material to the heat temperature beyond a certain maximum time period in order to insure quality of the product or economy of operation, or both, utilizing steam, air or electricity as the heating medium, and varying the intensity of the heat application by pressure or potential regulation thereof. As a result of the multitudinous questions involved in the proper drying of different materials, it has heretofore been necessary for a single factory to install many different kinds of apparatus and each apparatus is adaptable to only a comparatively narrow or restricted drying range.

It is the aim and purpose of my present improvement to relieve the manufacturer of the expense involved in the purchase and installation of numerous and different types of dryers, and to this end I propose to provide standardized drying sections any number of which may be operatively so associated and united to each other as to provide a complete drying chamber of any required length, together with a standard material feeding section and a standard material receiving and discharging section. In one embodiment of the apparatus, a conveyor supporting frame unit is provided for each of the sections above referred to, said frame units being readily insertable into or removable from the apparatus sections and means for detachably and adjustably connecting the frame units to each other to thereby produce what is in effect practically a continuous integral drying mechanism.

My invention further comprehends the provision of a simple, novel and effective means for applying the necessary heat temperature to the material during its passage through the connected drying chamber sections.

The invention further contemplates the provision of means for either intermittently or continuously moving the material to be dried through the drying chamber and for controlling the rapidity of such movement in accordance with the humidity or moisture content of the material to be dried.

As a further item of improvement in an apparatus of this character I have provided improved means for controlling the feed of the plastic material to the endless belt or conveyor and effecting an even distribution of the material in a layer of uniform thickness over the surface of the belt.

With the above and other objects in view the invention consists in the improved form construction and relative arrangement of the several parts of the apparatus as will be hereinafter more fully described, illustrated in the accompanying drawings and subsequently incorporated in the subjoined claims.

Referring to the drawings in which I have illustrated several satisfactory and desirable embodiments of the invention and in which similar reference characters designate corresponding parts throughout the several views.

Figures 1, 3, 4:
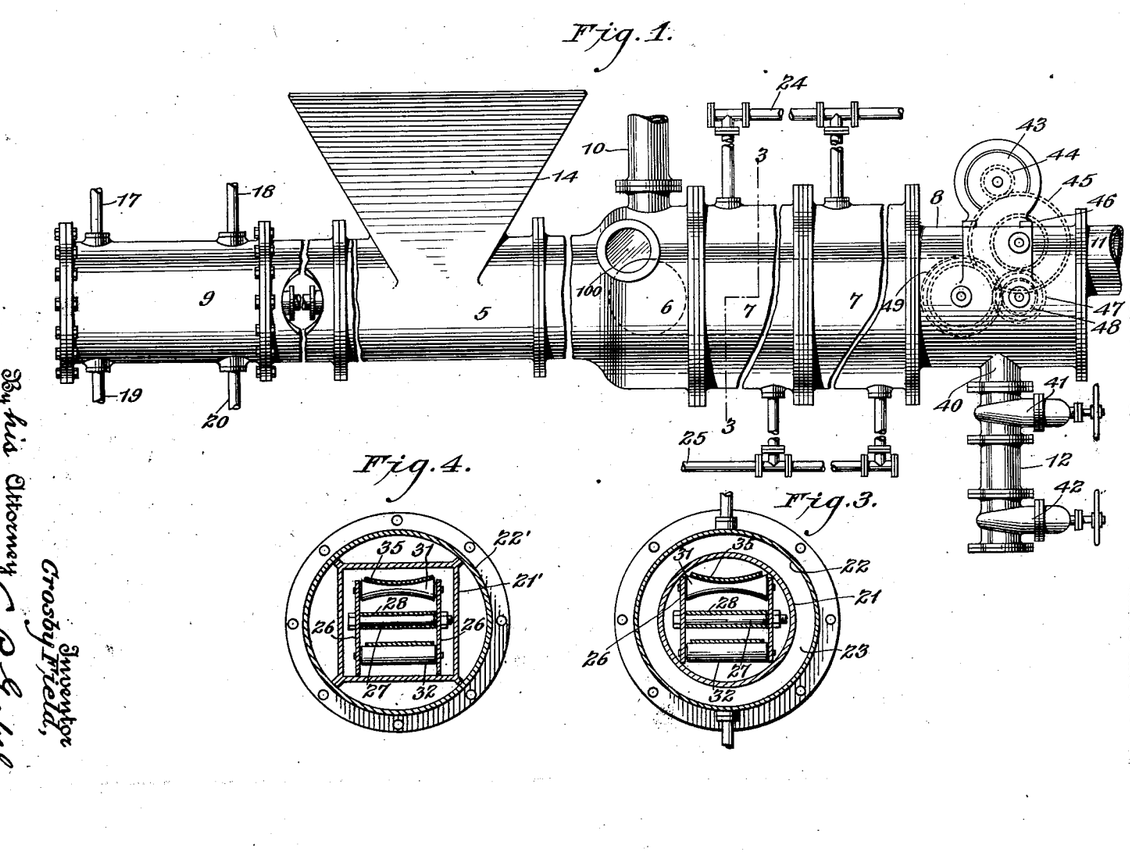
Figure 1 is a side elevation partly broken away of the complete drying apparatus.
Figure 3 is a transverse sectional view taken on the line 3—3 of Figure 2.
Figure 4 is a similar view showing an alternative form of the drying chamber.
Figure 2:
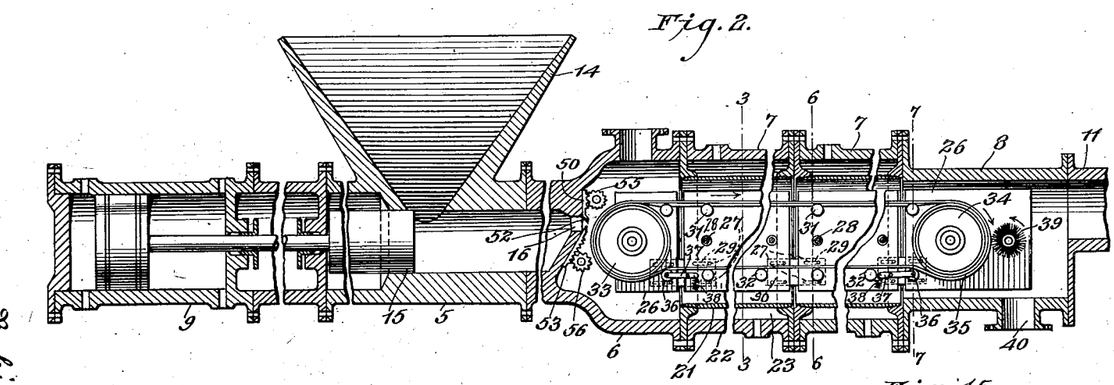
Figure 2 is a vertical longitudinal sectional view throughout the apparatus.

Referring in detail to the drawings and more particularly to Figures 1, 2 and 3 thereof, 5 designates the hopper section of the apparatus, 6 the feed and material receiving section thereof, 7 a series of drying chamber sections and 8 the material discharging section. The sections 6, 7 and 8 will be of standard construction and will not require changes of a material character, regardless of the nature of the material being operated upon. To the hopper section 5 an operating section 9 is connected or attached, but in practice this pump section as well as the hopper section 5 may be changed or modified in order to suit the particular material to be dried.

In case it is desired to create a vacuum the pipe 10 may be attached, or if additional hot air or gas is necessary the pipe 11 is used. When the dryer is under vacuum a receiver 12 for the dried material may be readily attached to the section 8 as shown.

14 designates the receiving hopper for the material to be dried and from this hopper the material falls by gravity into the section 5. A plunger 15 is operated to force the material longitudinally into the feed section 6 and causes the extrusion of the material through the nozzle orifice 16 upon an endless belt to be presently referred to. 17 and 18 designate the steam supply pipes for the operating section 9 and 19 and 20 the exhaust pipes.

Each of the drying chamber sections 7 consists of an inner wall 21 surrounded by the jacket wall 22, said walls being suitably spaced apart to provide the continuous space 23 for the reception of steam or other suitable heating medium. 24 designates the steam supply pipe from which branches lead to the several dryer sections 7 while 25 indicates the drain pipe to carry off condensed water. The several dryer sections 7 as well as the hopper and feed sections and the discharge section of the apparatus are provided with suitable coupling flanges adapted to be detachably bolted together. Preferably suitable packing gaskets are placed between these flanges so as to render the interior of the apparatus substantially air tight.

Figure 5:
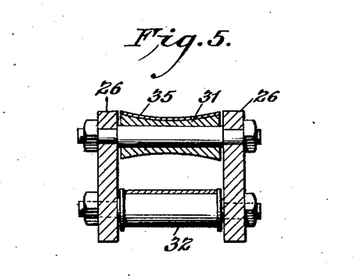
Figure 5 is a detail transverse section of the conveyor supporting frame on an enlarged scale illustrating the mounting of the conveyor rollers.
Figure 6:
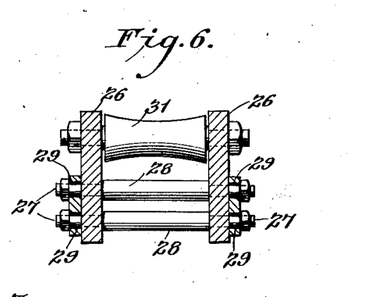
Figure 6 is a similar sectional view taken on the line 6—6 of Figure 2.

Within each of the dryer sections 7, in the feed section 6 and the discharge section 8 a conveyor supporting frame is adapted to be arranged. In one embodiment of the invention, this frame consists of spaced parallel plates 26. These plates are so spaced apart that when arranged within the drying chamber, they will contact at their upper and lower edges with the wall thereof. These plates are connected by the bolts 27 upon which suitable spacing sleeves 28 are engaged. The bolts 27 extend through the plates 26 adjacent to their ends and the slots 29 in the adjustable connecting plates 30 whereby the frames in the several sections of the apparatus may be adjustably connected to each other. Between the plates 26 and adjacent to the upper edges thereof the peripherally concaved rollers 31 are mounted while adjacent to the lower edges of said frame plates the rollers 32 are rotatably arranged. These latter rollers may be of uniform diameter throughout their length.

Between the frame plates 26 in the feed section 6 of the apparatus a belt drum 33 is mounted and a similar drum 34 is rotatably supported between the frame plates in the discharge section 8. An endless conveyor belt 35 traverses these drums, the upper stretch of said belt being supported upon the upper series of rollers 31 while the lower stretch of said belt passes over the lower series of rollers 32. For the purpose of applying the necessary tension to the belt the rollers 36 are mounted between levers 37 which are fulcrumed intermediate of their ends and to which the contractile springs 38 are attached. These rollers exert an upward tensioning pressure against the lower stretch of the conveyor belt adjacent to the drums 33 and 34. Between the spaced plates of the frame unit arranged in the discharge section 8 of the apparatus a suitable brush 39 is mounted which is adapted to co-act with the conveyor belt to remove the dried material from the surface thereof and direct the same through the outlet 40. Suitable valves indicated at 41 and 42 respectively control the exit of the dried material without destroying the vacuum within the drying chamber when used.

For the purpose of driving the conveyor belt and the brush 39 I have herein illustrated a motor 43 the shaft of which is operatively connected with the shaft of the brush 39 through the medium of the gears 44, 45, 46 and 47. Movement is transmitted to the endless conveyor belt by the gear 48 on the brush shaft meshing with a gear 49 on the shaft of the drum 34. Thus it will be seen that the conveyor belt will be continuously driven in the direction indicated by the arrow.

Figure 20:
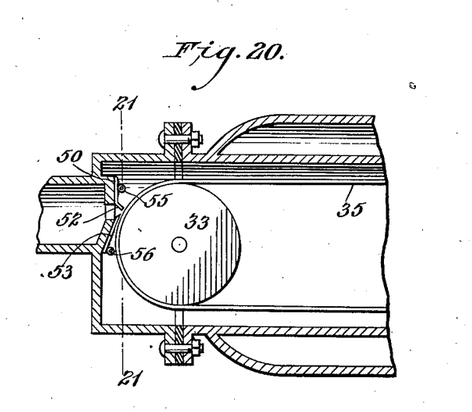
Figure 20 is an enlarged detail section through the outlet nozzle illustrating the means for regulating the feed of the material from the nozzle orifice to the conveyor belt.
Figure 21:
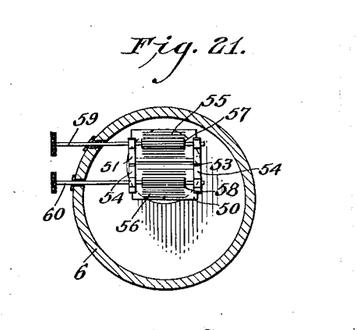
Figure 21 is a transverse section taken on the line 21—21 of Figure 20.

For the purpose of regulating the flow of the material from the nozzle orifice upon the surface of the conveyor belt, I provide the nozzle with a rectangular horizontally extending orifice 16 of relatively large size and on the end of the nozzle wall above the orifice a doctor plate 50 is mounted in suitable guides 51. The doctor plate is provided at its lower end with a flange 52 projecting towards the curved portion of the conveyor belt passing around the drum 33. It will be noted that the outlet orifice 16 is located above the axial center of the drum. Thus when the doctor plate is removed towards or from the upper edge of the orifice, the space through which the material may be extruded upon the belt surface is varied accordingly. A second doctor plate 53 is also provided below the orifice and is adjustable so as to maintain a minimum clearance between the belt surface and the orifice wall. This plate likewise is arranged in suitable guides 54. The doctor plates 50 and 53 are provided with the longitudinal series of teeth 55 and 56 respectively with which pinions 57, 58 fixed on shafts 59, 60 respectively are engaged. These shafts extend transversely through the wall of the feed section 6, suitable stuffing boxes being preferably provided therefor. Thus it will be seen that the doctor plates 50 and 53 may be readily actuated and adjusted so that a layer of the material to be dried of the desired thickness will be uniformly distributed over the surface of the conveyor belt.

In the operation of an apparatus of the above description, any desired number of the standardized drier chamber sections may be assembled and rigidly connected together, one of the frame units being arranged in each of the drier sections and said units properly adjusted and readily connected by means of the plates 30 to provide a practically continuous support for the movable conveyor belt. As the food plunger 15 is operated, the material falling from the hopper 14 into the section 5 is forced through the nozzle orifice 16 and upon the end of the conveyor belt in the section 6 where it passes over the drum 33. As the upper stretch of the drum continues its movement in the direction indicated by the arrow, which movement is properly synchronized with the extruding movement of the plunger 15, the moisture in the material is evaporated as it passes successively through the several sections of the drying chamber by the heat which is transmitted through the inner wall 21 from the steam chamber 22. By first accurately determining the moisture content of the particular material, the number of drier chamber sections necessary so that the material may be subjected to the heat temperature for a sufficient length of time to completely dry the same, may be easily calculated. When the material on the conveyor belt finally passes around the drum 34, it is thoroughly dry, and the bristles of the brush 39 engaging this material scrape or remove the same from the belt surface and direct such material downwardly through the outlet 40. It will thus be seen that I have devised an apparatus of great utility, since it may be adapted for use in the drying of materials which vary greatly in moisture content. The frame units are also of standard construction and can be easily and quickly assembled within the drying chamber sections or as readily removed therefrom.

In Figure 4 of the drawings I have illustrated a slightly modified form of the drying chamber wherein the inner wall 21′ is of rectangular instead of cylindrical form. This wall at its several corners may be welded or otherwise connected to the outer cylindrical wall 22′.

Figures 7, 8, 13, 14, 22:
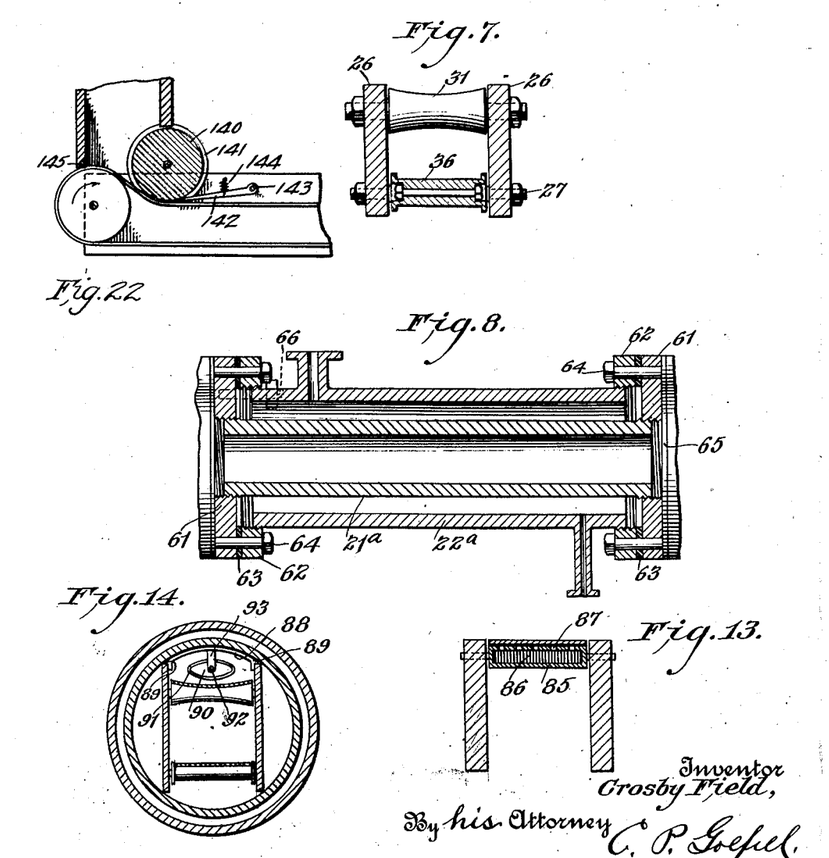
Figure 7 is a sectional view taken on the line 7—7 of Figure 2.
Figure 8 is a longitudinal section illustrating a slightly modified form of one of the drying chamber sections.
Figure 13 is a transverse section through the conveyor frame with an alternative means for applying heat to the conveyor belt.
Figure 14 is a transverse sectional view through one of the dryer sections illustrating another alternative means for heating the material.
Figure 22 is a detail vertical section of an alternative means for controlling the vertical feed of the material to the conveyor belt.

In Figure 8 of the drawings I have shown another modified form of the standard drier sections of the apparatus in which the inner cylindrical wall 21ª is threaded at its ends in a collar 61 and the outer cylindrical wall 22ª is threaded at its ends in the separate collar 62. Between these collars gaskets 63 are arranged. Collars 61 and 62 are securely bolted as at 64 to the end collars of an adjacent section of the drier and between the two sets of collars a gasket 65 is disposed. For the purpose of lining up the inner walls 21ª and the outer jacket walls 22ª before bolting the several sections together, I provide three screws 66 at each end of each section which are spaced approximately 120° apart. It will be understood from the drawing that the bolts 64 will hold the sections in line when assembled, but before assembly it is desirable to have the inner and outer walls in accurate alignment. These three screws may be individually adjusted so as to position the inner wall in concentric relation to the outer wall. In assembling the structure shown in Fig. 8 one flange 61 is screwed down to pipe 21ª and a gasket 63 is then inserted over said pipe against one side of the flange. The pipe 22ª to which has been applied one of the flanges 62 is then arranged over the pipe 21ª. The screws 66 are then inserted through openings to the flange 62 and threaded in the flange 61 to line up the cylinders or pipes 21ª and 22ª in concentric relation with each other. The other flange 62 is then applied to the opposite end of the outer cylinder 23 and the gasket 63 placed in position against this flange and the other flange 61 then screwed upon the projecting end of the inner cylinder 21ª.

The second set of screws 66 are then applied so that both ends of the outer cylinder 23 will be lined up in proper concentric relation with the inner set. Finally, the securing bolts 64 are applied so as to thereby tighten up or compress the gasket 63.

Figures 9, 10:
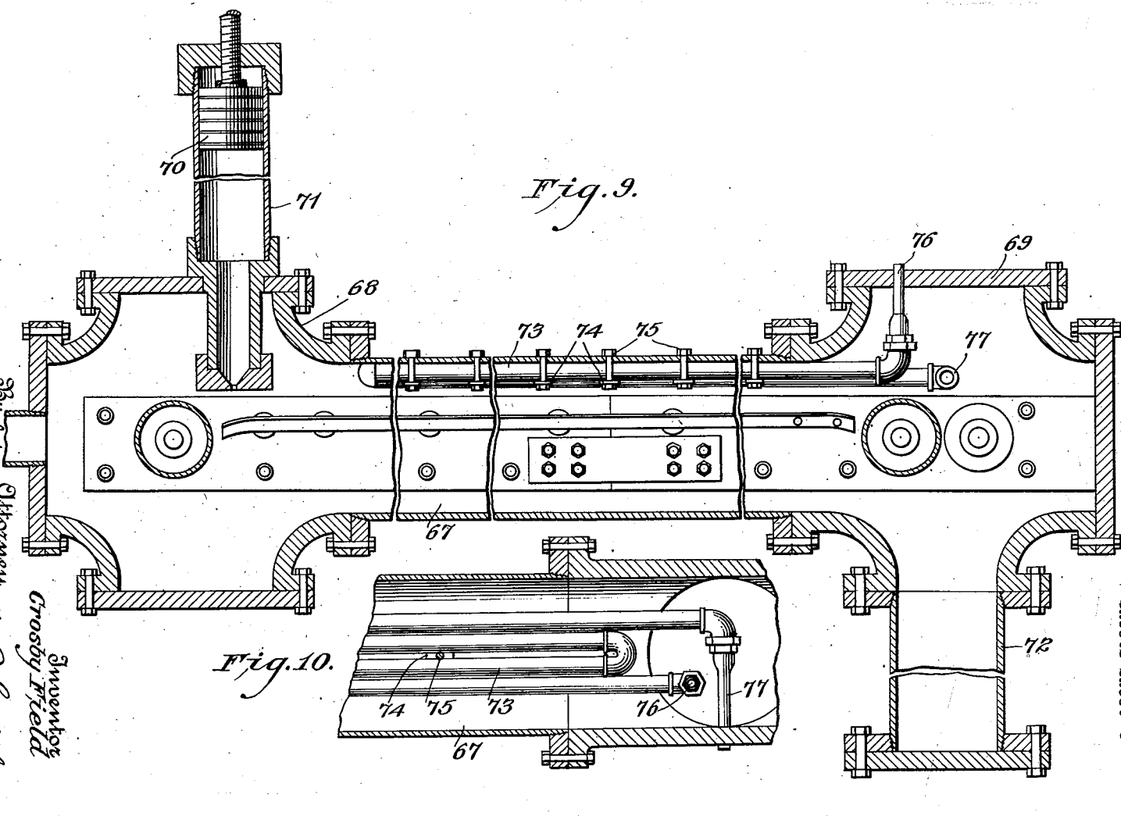
Figure 9 is a longitudinal sectional view illustrating an alternative embodiment of the apparatus.
Figure 10 is a fragmentary horizontal section.

In Figures 9 and 10 I have illustrated an alternative embodiment of the apparatus wherein the drying chamber 67 may be composed of any desired number of standard sections, and within which the material conveyor and supporting frame therefor, substantially of the same construction as that above described, are adapted to be arranged. To the opposite ends of the drying chamber 67 the cruciform heads 68 and 69 respectively are detachably secured. The head 68 constitutes a receiving chamber for the material into which the endless conveyor belt extends, and in this case the force feed plunger 70 operates in a vertically disposed cylinder 71 to feed the material under pressure upon the upper stretch of the conveyor belt. The material may be introduced into this cylinder in the manner shown in Figure 1 of my patent issued Nov. 9, 1920, No. 1,358,431. Hereinafter I shall more particularly describe a preferable embodiment of the vertical type of material feed mechanism, which may be used in conjunction with this form of apparatus. The other head 69 constitutes the discharging chamber for the material in which the rotary brush as above referred to is mounted and whereby the material is discharged from the conveyor belt downwardly into the outlet pipe or tube 72.

It will be observed however that in this construction of the apparatus the drying chamber is not provided with a jacket wall affording a steam receiving space longitudinally and circumferentially coextensive with the drying chamber. In lieu thereof I provide a steam pipe coil 73 which extends for substantially the entire length of the drying chamber and is made up of a plurality of pipe sections coupled together at their ends by suitable joint connections. This pipe coil is supported against the top wall of the drying chamber by means of saddle plates 74, engaging the undersides of the intermediate pipe sections and the bolts 75 extending through the wall of the drying chamber and connected at their lower ends to said plates. 76 designates the steam inlet connection and 77 the outlet connection of the heating coil. It will thus be apparent that when the steam is turned into this coil, the heat will be radiated therefrom downwardly upon the material upon the upper stretch of the conveyor belt which is in immediate proximity to the heating coil.

Figure 11:
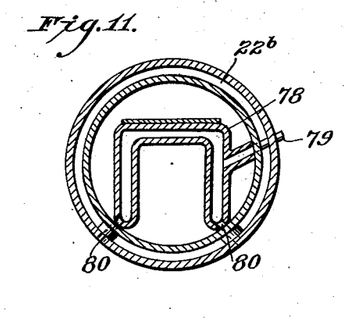
Figure 11 is a transverse section of one of the dryer sections showing a modified construction of the conveyor supporting frame.
Figure 12:
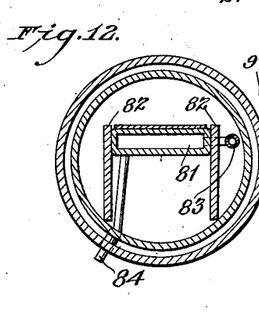
Figure 12 is a similar view illustrating another embodiment of said frame.

In Figures 11 and 12 I have illustrated other ways in which the material may be heated and dried during its passage through the drying chamber. In this case the drying chamber is provided with a jacket 22ᵇ for heat insulating purposes and the frame for supporting the upper stretch of the conveyor belt is in the form of a hollow inverted channel shaped "hot plate" 78. The side portions or legs of this "hot plate" are engaged with the wall of the drying chamber and to one of these legs the steam supply pipe 79 is connected. 80 indicates drains which are connected to a suitable trap and carry off the condensed water. In this construction as shown in Figure 11, the upper stretch of the conveyor belt is engaged upon and moves longitudinally over the upper horizontal surface of the hot plate 78 and the material carried by this belt is heated by conduction so that it will be thoroughly dried by the time the material reaches the discharge end of the drying chamber.

In Figure 12 I have shown a slightly different form of the hot plate construction wherein the plate consists of a hollow rectangular body 81 extending longitudinally in the drying chamber between the upper ends of the spaced vertical supports 82. 83 indicates the steam supply pipe connection to the interior of the hot plate and 84 the drain which leads to the trap. This construction operates in the same manner as that above described to properly dry the material.

In Figure 13 I have shown still another alternative form of the heat applying means wherein the longitudinally extending plate 85 supporting the upper stretch of the conveyor is provided with an electrical resistance unit 86. In this construction, if desired the upper wall of the plate 85 may be perforated as at 87 so as to admit of a more direct application of the heat to the conveyor belt.

Figure 15:
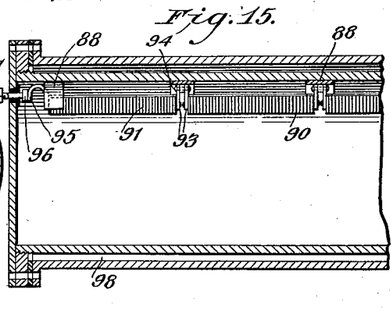
Figure 15, is a detail fragmentary section of the heating means shown in Figure 14.

In Figures 14 and 15 of the drawings I have illustrated an alternative form of the electrical heating means. In this construction curved or bowed metal bridging elements 88 are arranged between the frame plates in which the conveyor supporting rollers are mounted, each of said elements being provided upon its ends with lugs 89 for engagement upon the upper edges of said plates. Each of the heating units consists of an elongated body 90 of porcelain or other insulating material around which the electrical resistance wire 91 is wound. Each of the insulating sections 90 is longitudinally bored to receive a rod 92 the ends of which are engaged through apertures in the suspending links 93 which are connected to the bridge elements 88 by means of the pins 94. The resistance wires 91 of the several heating units are electrically connected with each other by suitable metallic contacts or connections and at one end of the series of heating units a spring metal clip 95 is connected at one of its ends with the resistance wire while the other end of this strip bears against the head 96 on the inner end of a binding post 97 which is suitably insulated from the part in which it is mounted. As shown in Figure 14 of the drawings, the electrical heating units are suspended closely adjacent to the material on the upper stretch of the conveyor belt. Thus heat of any desired intensity may be directly applied to the material so as to properly dry the same in its passage from one end to the other of the drying chamber. The wall of the drying chamber may if preferred be provided with a jacket 98 in order to prevent condensation of moisture within the chamber.

Figures 16, 17:
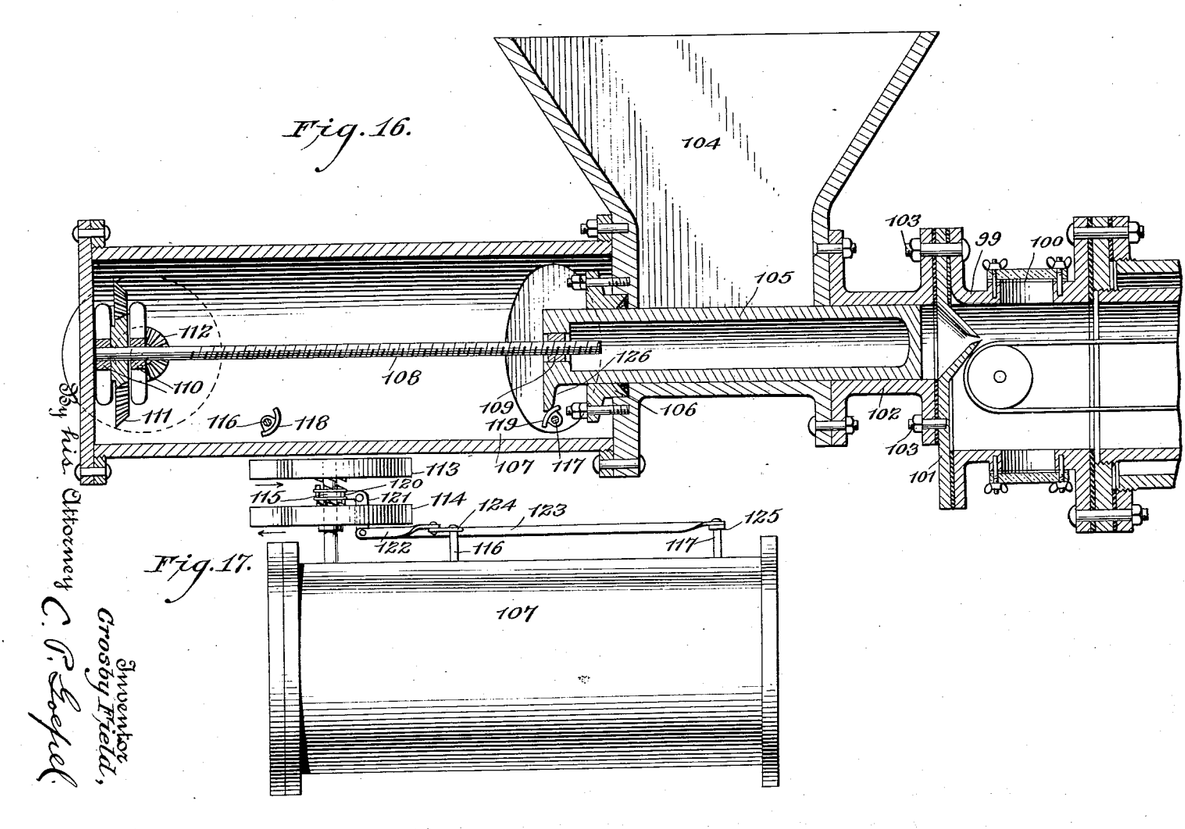
Figure 16 is a longitudinal sectional view showing another means for feeding the material to the conveyor belt.
Figure 17 is a plan view illustrating one mechanical means for automatically reversing the movement of the feed plunger.

In Figure 16 of the drawings I have illustrated another embodiment of the horizontal feed type of drying apparatus wherein the drying chamber sections are of substantially the construction shown in Figure 8. To the end section of the drying chamber the material receiving section 99 is attached and is provided with one or more glass covered sight openings 100 through which the feed of the material upon the end of the conveyor belt mounted within said section may be observed. To this receiving section the nozzle plate 101 and the plunger guide connection 102 are attached by means of the bolts 103. The other end of the member 102 is secured to one side of the hopper 104. Thus by detaching this plunger guide and spacing member 102, the nozzle plate 101 can be readily removed.

The horizontally movable plunger 105 traverses the lower end of the hopper and reciprocates within the member 102, said plunger being movable through a suitable stuffing box 106 in one side wall of the hopper, and into the horizontally extending chamber 107. Within this chamber the plunger operating screw 108 is located said screw having a threaded connection 109 with one end of the plunger 105. The other end of this screw is journaled in spaced bearings 110 and between said bearings a beveled gear 111 is fixed upon the screw. The beveled pinion 112 has meshing engagement with one side of said gear, the pinion shaft being mounted in the wall of the chamber 107 and extending exteriorly thereof. Upon the outer end of this shaft spaced belt wheels 113 and 114 are loosely mounted. These wheels are driven in relatively opposite directions by means of suitable belts not shown, from any convenient source of power. Upon the pinion shaft between the belt wheels a clutch member 115 is keyed for axial movement, said clutch member being of the double type to coact with complementary clutch elements on the opposed faces of pulleys 113 and 114.

Through one side of the wall of the chamber 107 and at each end thereof rock shafts 116, 117 respectively extend. Upon each of these rock shafts within the chamber 107 a curved dog 118, 119 respectively is fixed. The clutch shifting yoke 120 is operatively connected at its lower end to one arm of a bell crank lever 121, the other arm of said lever being connected by rods 122 and 123 respectively to the arms 124 and 125 which are fixed upon the outer ends of the shafts 116 and 117 respectively.

Upon the end of the plunger 105 a downwardly projecting tappet lug 126 is formed. From the preceding description, assuming that the clutch 115 is engaged with one of the driven pulleys 113 or 114 to move the plunger 105 towards the left from its illustrated position, when the lug 126 engages the dog 118, the shaft 116 will be rocked and through the medium of the rod 122 and bell crank 121, the yoke 120 will be actuated to shift the clutch 115 into operative engagement with the other of the driven wheels. Thus the rotation of the screw 108 will be automatically reversed and the plunger 105 will then travel towards the right. The material which has fallen in the lower end of the hopper into the path of the plunger will thus be forced through the connection 102 and extruded through the nozzle outlet in the form of a thin layer upon the upper surface of the conveyor belt. When the plunger reaches the end of such extruding movement, the lug 126 will strike the dog 119 and thus rock the shaft 117 to actuate the yoke 120 through the medium of the rod 123 and the bell crank 121 to again shift the clutch and reverse the rotation of the screw so that the plunger movement will be reversed. It will thus be seen that the movements of the plunger are automatically controlled and after the operation of the apparatus has been started, no further attention in so far as the feeding of the material is concerned, is required upon the part of the operator.

Figure 18:
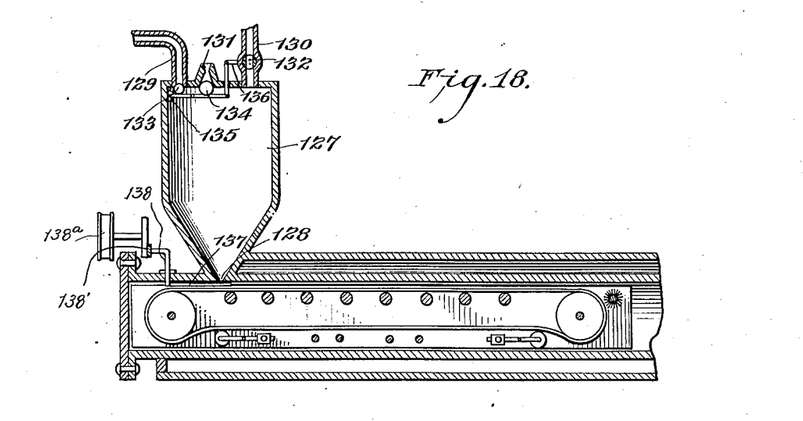
Figure 18 is a longitudinal section showing another alternative means for feeding the material to the belt.

In Figure 18 of the drawings I have illustrated a vertical feed type of drying apparatus wherein the hopper 127 is mounted at one end of the drying chamber and is provided at its lower end with the extruding orifice 128 through which the material is expelled in the manner to be presently described upon the upper stretch of the belt or conveyor. 129 designates the hopper inlet connection extending from the source of supply of the material to be dried. A pipe 130 from a source of compressed air or gas is connected to the top of the hopper while 131 designates a vent opening. The pressure fluid supply pipe 130 is equipped with a quick acting valve 132. Loosely connected float valves 133 and 134 are arranged within the hopper and pivoted at 135, said valves acting to close the material inlet connection 129 and the vent 131 respectively. The float valve 134 is of larger diameter than the valve 133 and is operatively connected to the arm of the quick acting valve 132. As the hopper is filling with material supplied through the inlet 129, the float valves 133 and 134 are both open, and, therefore, the quick acting valve 132 is closed. As the hopper becomes filled with the material, the float valves 133 and 134 are gradually lifted and the latter being the larger, first closes the vent 131 and simultaneously opens the quick acting valve 132. This permits the pressure fluid such as compressed air, to enter the hopper through the pipe 130 above the level of the material. The pressure fluid which in some cases may be a special gas, then acts against the valve 134 causing it to seal the vent 131 still tighter and also, by virtue of such pressure exceeding the pressure in the inlet pipe 129, acts to seal the float valve 133 upon its seat. The gas pressure in the upper end of the hopper then causes the material to be expelled through the orifice 128 and when the hopper is exhausted, the pressure fluid likewise rapidly exhausts through said orifice. Inasmuch as the volume of the gas entering through the valve 132 is restricted by the pipe, valves, fittings, etc., as well as the initial pressure, and inasmuch as the area of the orifice 128 is unobstructed after the material has been exhausted from the hopper, the pressure in the hopper immediately falls regardless of the continuing supply of pressure fluid through the connection 130. Upon this relative decrease of pressure in the hopper, valve 134 immediately falls, thus closing the valve 132. Thereafter the pressure in the hopper continues to decrease so that the valve 133, if it has not already opened, will do so under the pressure of material in pipe 129 and permit a fresh charge of the material to enter the hopper.

In this embodiment of the invention I have shown a knife 137 mounted beneath the orifice 128 and supported for horizontal movement. In the present instance, I have shown the knife 137 fixed at one of its ends to a vertically disposed shaft 138 having a crank arm on its upper end which may be actuated through the medium of an eccentric link connection 38 or other equivalent means from a belt driven pulley 38', as will be readily understood. It will of course be understood that at the orifice 128 the inner surface of the cylinder wall is suitably flattened for the co-operation of the knife blade 137 therewith, or, if desired, the inner cylinder wall may be of the rectangular cross-section shown in Fig. 4 of the drawings. Thus it will be understood that in this case the material is fed to the conveyor belt in sections.

Figure 19:
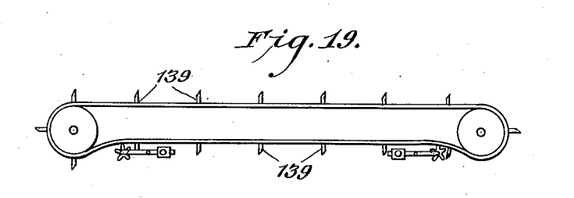
Figure 19 is a detail illustrating another type of conveyor belt which may be employed.

In Figure 19, I have illustrated a slightly modified form of the conveyor which may be employed in connection with this embodiment of the invention. From reference thereto it will be noted that the surface of the conveyor belt has suitably secured thereon a plurality of transverse longitudinally spaced blades 139. These blades have sharp edges so that as they successively pass across the orifice 128, they will cut off the material. Thus it will be seen that a conveyor belt of this type may be utilized in lieu of the horizontally swinging cutting knife above referred to.

In Figure 22 of the drawings I have illustrated another alternative means for distributing the material from the hopper upon the surface of the conveyor belt. In this arrangement, the relatively narrow extruding orifice is eliminated and a wheel 140 is rotatably mounted in one side of the hopper at its lower end. This wheel is provided with a circumferential groove 141. A doctor plate 142 is pivotally mounted at one of its ends as at 143 and is yieldingly held at its other end against the base wall of the groove 141 by means of the spring 144. The wheel 140 is spaced from the belt drum and the upper stretch of the conveyor belt passes over the drum and under the wheel 140. A sealing roller 145 is mounted between the upper side of the belt drum and the wall of the hopper. The material in the hopper is forced downwardly under pressure upon the belt and into the groove 141 of the wheel 140. As this wheel rotates, it carries a layer of the material from the hopper equal to the distance between the belt surface and the base wall 141 and this layer of material is separated or detached from the wall of the groove by the doctor plate 142. Of course the thickness of this layer of material is determined by the depth of the groove in the wheel 140 and the pressure upon the material.

Figure 24:
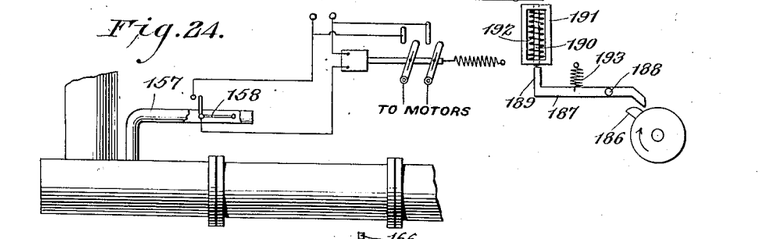
Figure 24 is a diagrammatic view showing electrical means for governing the feed and belt travel in accordance with the humidity of gases exhausted from the drying chamber.

Instead of utilizing the lapse of time as the limiting factor for maintaining the material in the presence of the drying atmosphere I may utilize the humidity of the exhaust gases from the drying chamber for this purpose. Thus as indicated in Figure 24 the drying chamber is provided with a vapor or gas exhaust pipe 157 and in this pipe there is located an element 158 which is sensitively responsive to changes in humidity of the exhaust vapor. A preferred mounting and arrangement of this element 158 is more fully disclosed in detail in Figure 25 of the drawings from reference to which it will be noted that said element which is of fibrous material, such as hemp twine is transversely arranged within the exhaust pipe or conduit and is connected at its ends to rods 159 and 160 respectively. The rod 160 is movable through a stuffing box 161 and is threaded at its outer end to receive the nuts 162 arranged on opposite sides of bracket 163. The other rod 159 is likewise movable through a stuffing box 164 and has a coil spring 165 attached to its outer end. This spring is connected to a threaded rod 166 movable through an opening in a second bracket 167. By the proper adjustment of the nuts 168 threaded upon said rod, the tension of the spring 165 may be regulated.

Figure 25:
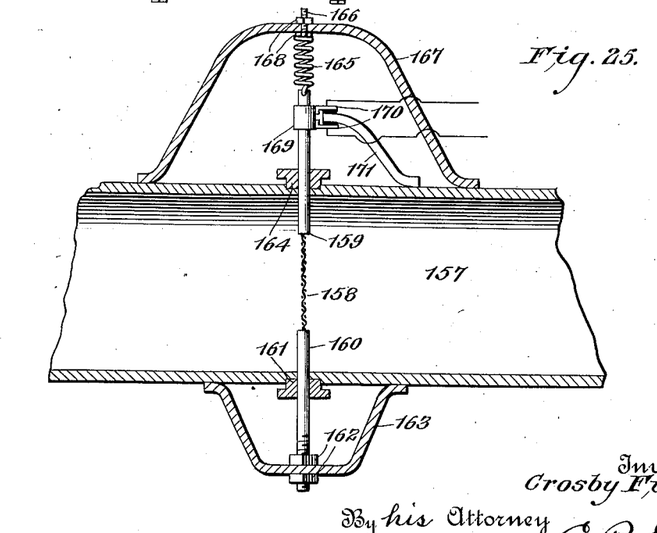
Figure 25 is an enlarged detail section of a specific form of the humidity responsive means.

Upon the rod 159 and suitably insulated therefrom, a circuit closing contact 169 is arranged. This contact is adapted for engagement with spaced conductors 170 which are connected to opposite sides of the circuit and are mounted upon a fixed arm 171 and suitably insulated from each other. In a circuit the switch operating solenoid 171' is arranged to control the supply of current for the operation of the motors. In the operation of this arrangement, it will be understood that upon a decrease in humidity the element 158 will expand and open the energizing circuit switch operating solenoid. Thus upon completion of the drying operation the belt operating and feed motors will be automatically stopped. Upon an increase in the humidity of the exhaust vapors, the element 158 will contract and again move the contact 169 into engagement with the current conductors 170 and thus close the circuit by the closing of the automatic switch so that the motors are again set in operation.

In the drying of certain materials it is desirable to provide a more positive control of the belt drive and feed mechanism than can be obtained by means of the time lag in the operation of mechanical instrumentalities. I have secured this positive control by means of the arrangement shown in Figure 23 which may be combined with the embodiment of the invention shown in Figure 24.

Figure 23:
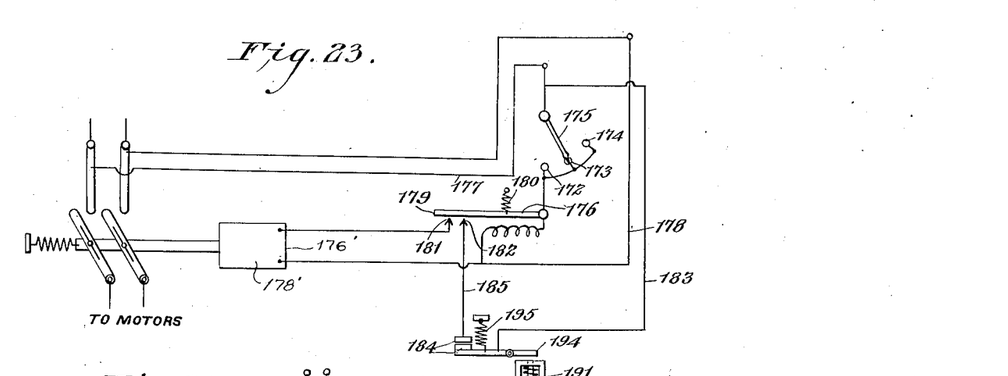
Figure 23 is a similar view showing an electrically operated means for the positive control of the conveyor belt and feed mechanism.

As in the preceding description, the current is supplied by wires 195 from any suitable source through the medium of the normally open switch actuated by the solenoid. In this instance 172, 173 and 174 indicate spaced contacts of the clock or other equivalent time mechanism which are adapted to be engaged by the movable contact finger 175. 176 designates a relay in circuit with the contacts 172, 173 and 174. A wire 177 connects one side of the circuit to the contact finger 175 while the contacts 172, 173 and 174 are connected to the other side of the circuit through the solenoid 176' of the relay 176 by means of the wire 178. Thus it will be understood that when the finger 175 is in engagement with one of the spaced contacts, the relay is energized and the armature plate 179 thereof is moved against the action of the spring 180 into engagement with the contacts 181 and 182 whereby the switch operating solenoid 178' will be energized. Simultaneously a shunt circuit is closed through wire 183, contacts 184, wire 185, contact 182, armature plate 179 and wire 178 so that the circuit for the switch solenoid will be held closed even after the finger 175 moves out of engagement with contact 172. This circuit will remain closed until the contacts 184 are separated, whereupon the solenoid of the relay 176 is de-energized causing the spring 180 to break the circuit of the switch solenoid at the relay. It is only when the belt has been supplied with a charge and traveled its allotted length that the cam link and pin mechanism 186, 187 and 190 operate so that the pin 190 is actuated to disengage the contacts 184 from each other for an instant. This breaks the shunt circuit energizing the relay coil whereupon the relay opens, the solenoid is de-energized and the motor stops.

A cam 186 is geared to the belt drive mechanism so that it makes one revolution for each travel of the belt through the complete length of the drying chamber, or approximately one-half the total length of the belt. Thus after the movement of the belt and the feeding operation have been started, such operations will continue until the peripheral finger or projection on the cam 186 strikes one end of the oscillatory trigger member 187 which is pivoted as at 188. The other end of this trigger member is formed with a drive pin 189 which is adapted to strike the rod 190 mounted for axial movement in a supporting yoke 191 and yieldingly held against such movement by the spring 192. A spring 193 connected to lever 187 normally holds the pin 189 against the opposed end of the rod 190. Thus it will be seen that when the trigger member or lever 187 is moved by the cam, the spring 193 is expanded. Upon the sudden release of the trigger member and the contraction of the spring 193, the pin 189 delivers a violent blow against the end of rod 190 which is transmitted by said rod to one end of the pivoted lever 194 carrying one of the contact elements 184. Thus this contact element is moved away from the opposed contact element and the circuit broken, resulting in the de-energizing of the solenoid and the opening of the switch. The spring 195 connected to lever 194 returns said lever to its normal position and holds the contacts 184 in engagement with each other. In this manner, it will be seen that the movement of the material carrying belt and the operation of the feed mechanism will be very positively controlled and limited.

From the foregoing description considered in connection with the accompanying drawings, it is believed that the construction, manner of operation and numerous advantages of the several illustrated and described embodiments of the invention will be clearly and fully understood. By constructing a drying chamber in standard sections, a chamber of any required length in accordance with the nature of the material being dried may be readily produced. Also it will be appreciated that the improved automatic feed control means of either the horizontal or vertical type as herein described insures the proper feed of the material at all times to the conveying belt without necessitating the more or less constant attention of the operator. I have herein referred to several constructions of the extruding nozzle for the material for the purpose of maintaining a uniform thickness or spread of the material over the surface of the belt. However, this feature of the invention may be variously modified. Also the several other mechanical features of the invention are susceptible of considerable modification in details thereof, and it is accordingly to be understood that I reserve the privilege of adopting all such legitimate changes as may be fairly embodied within the spirit and scope of this invention as claimed.

I claim:

1. In a drying apparatus, a plurality of drying chamber sections, a material receiving section and a material discharging section the sections being provided with means whereby any desired number of the chamber sections may be connected with the receiving and discharge sections in operative relation to each other, and a material conveyor support consisting of a plurality of units adapted to be arranged within the drying chamber sections.

2. In a drying apparatus, a plurality of drying chamber sections, a material receiving section and a material discharging section the sections being provided with means whereby any desired number of the chamber sections may be connected with the receiving and discharge sections in operative relation to each other, and a material conveyor support consisting of a plurality of units adapted to be arranged within the drying chamber sections, and means for adjustably connecting the supporting units to each other.

3. In a drying apparatus, a plurality of drying chamber sections, a material receiving section and a material discharging section the sections being provided with means whereby any desired number of the drying chamber sections may be connected in operative relation with the receiving and discharging sections, a conveyor extending longitudinally through the drying chambers, means for feeding the material under pressure to one end of the conveyor, and means for automatically controlling and synchronizing the operation of the conveyor and the material feeding means.

4. In a drying apparatus, a drying chamber, a material conveyor extending through said chamber, means for feeding the material to be dried to one end of the conveyor, and means for automatically synchronizing the operation of the conveyor and the feeding means to thereby subject the material to the heat of the drying chamber for a desired period of time.

5. In a drying apparatus, a drying chamber, a material conveyor extending therethrough, means for supplying heat to said chamber, means for feeding the material to one end of the conveyor, means for imparting an operating movement to the conveyor, and automatic controlling means adapted to cause said means to operate the conveyor intermittently.

6. In a drying apparatus, a drying chamber, means for supplying heat to said chamber, means for feeding the material to be dried into one end of the said chamber, means for moving the material from the receiving end to discharge end of the drying chamber, and automatic means for causing a series of interruptions of uniform duration in the movement of said material while in the drying chamber.

7. In a drying apparatus, a drying chamber, an endless material receiving conveyor extending longitudinally through said chamber, means for feeding the material to be dried upon the upper stretch of the conveyor at one end thereof, means for moving the upper stretch of the conveyor in the direction from the material receiving end toward the discharging end of the drying chamber, and automatic means for causing a series of interruptions of uniform duration in the movement of said conveyor.

8. In a drying apparatus, a drying chamber, a material receiving conveyor extending through said chamber, means for feeding the material to be dried to one end of said conveyor, and means governed by the moisture content of the material being dried to control the movement of the conveyor and vary the time of passage of the material through the drying chamber.

9. In a drying apparatus, a drying chamber, a conveyor extending therethrough, means for feeding the material to be dried to one end of said conveyor, and means influenced by the moisture content of the material being dried to automatically control the operation of the conveyor and the material feeding means.

10. In an apparatus of the kind described, means for conveying a material to be dried though a drying atmosphere, and means governed by the moisture content of the material for automatically controlling the operation of the conveyor means and varying the elapsed time during which the material is subjected to the drying atmosphere.

11. In an apparatus of the kind described means for conveying a material to be dried through a drying atmosphere, electrically controlled means for actuating the conveyor means, and means influenced by the moisture content of the material being dried for governing the operation of said electrically controlled means and varying the elapsed time during which the material is subjected to the drying atmosphere.

12. In an apparatus of the kind described, a drying chamber, means for conveying the material to be dried through said chamber, electrically controlled means for actuating the material conveying means, and means influenced by the moisture content of the material being dried for governing the operation of said conveyor actuating means and varying the time of passage of the material through the drying chamber.

13. In an apparatus of the kind described, a drying chamber, means for conveying material to be dried through said chamber, means for feeding the material to the conveying means, means for actuating the conveying means, means influenced by the moisture content of the material being dried to govern the operation of said conveyor actuating means and varying the rapidity of movement of the material through the drying chamber, and means for automatically controlling the feed of the material to the conveying means in accordance with the movement of the material through the drying chamber.

14. In a drying apparatus, a drying chamber, a material conveyor therein, a material receiving hopper and a feed nozzle at one end of said chamber, a material supply connection to the hopper, means for supplying a fluid under pressure to the upper end of the hopper, means for closing the material supply connection to the hopper when the hopper is filled with the material and simultaneously opening the pressure fluid supply and for automatically closing the pressure fluid supply connection and opening the material supply connection when the hopper is evacuated.

In testimony that I claim the foregoing as my invention, I have signed my name hereunder.

CROSBY FIELD.